United States Patent [19]

Millington et al.

[11] Patent Number: 4,730,027

[45] Date of Patent: Mar. 8, 1988

[54] METHOD OF MAKING STYRENE-TYPE POLYMER COMPRISING SUSPENSION POLYMERIZATION CONDUCTED IN AQUEOUS MEDIUM CONTAINING COMBINATION OF POLYVINYL ALCOHOL AND SULFONATED POLYSTYRENE OR SULFONATED STYRENE-MALEIC ANHYDRIDE COPOLYMER

[75] Inventors: James E. Millington, Lunenburg; Stephen V. Slovenkai, Leominster, both of Mass.

[73] Assignee: Huntsman Chemical Corporation, Salt Lake City, Utah

[21] Appl. No.: 393,220

[22] Filed: Jun. 28, 1982

[51] Int. Cl.$^4$ ................................................ C08F 2/20
[52] U.S. Cl. ............................. 526/201; 526/202; 526/203
[58] Field of Search .................. 526/201, 202, 203

[56] References Cited

U.S. PATENT DOCUMENTS

| | | | |
|---|---|---|---|
| 2,388,601 | 11/1945 | Collins . | |
| 2,555,298 | 5/1951 | Sturrock et al. | 260/93.5 |
| 2,673,194 | 3/1954 | Grim | 260/93.5 |
| 3,258,453 | 6/1966 | Chi | 526/201 |
| 3,488,745 | 1/1970 | Wright | 260/93.5 |
| 4,129,707 | 12/1978 | Wright | 526/204 |
| 4,174,425 | 11/1979 | Saito | 526/201 |
| 4,237,255 | 12/1980 | Murray | 526/201 |
| 4,237,257 | 12/1980 | Moriya | 526/347 |
| 4,367,320 | 1/1983 | Murray | 526/201 |

FOREIGN PATENT DOCUMENTS 120617  9/1980  Japan .

*Primary Examiner*—Christopher Henderson

[57] ABSTRACT

There is described a method of making a styrene-type polymer composition which comprises a step of suspension polymerizing a styrene-type monomer composition in an aqueous medium comprising water, polyvinyl alcohol and a water-soluble sulfonated polystyrene, a water-soluble sulfonated styrene-maleic anhydride copolymer or a mixture thereof. Optionally, the styrene-type monomer composition may contain a rubbery material as a toughening agent. Optionally, the suspension polymerization step may be conducted subsequent to a prepolymerization step conducted in mass.

3 Claims, No Drawings

METHOD OF MAKING STYRENE-TYPE POLYMER COMPRISING SUSPENSION POLYMERIZATION CONDUCTED IN AQUEOUS MEDIUM CONTAINING COMBINATION OF POLYVINYL ALCOHOL AND SULFONATED POLYSTYRENE OR SULFONATED STYRENE-MALEIC ANHYDRIDE COPOLYMER

BRIEF SUMMARY OF THE INVENTION

1. Technical Field

This invention relates to a method of making styrene-type polymer compositions by a suspension polymerization process or a mass-suspension two-step polymerization process. The suspension polymerization step is conducted in an aqueous medium comprising polyvinyl alcohol used as a suspending agent, and an extender. The styrene-type polymer composition may or may not be rubber-modified.

2. Background Art

As is well-known in the art, bead shape styrene-type polymer compositions are usually produced in suspension polymerization wherein the monomer composition is suspended in an aqueous medium in the presence of a suspending agent. Examples of such suspending agents useful for the commercial preparation of styrene-type polymer compositions include polyvinyl alcohol and difficulty water-soluble phosphate salts such as tricalcium phosphate. Usually an auxiliary material commonly called an extender is used in addition to the primary suspending agent. Such auxiliary suspending agents increase the stability of the suspension system and prevent the agglomeration of the polymer material. Examples of such auxiliary suspending agents include persulfate salts and anionic surfactants.

U.S. Pat. No. 2,388,601 to Collins, assigned to Shawiningan Chemical Co., describes a suspension polymerization of vinyl esters such as vinyl acetate wherein the suspending medium comprises as a dispersion agent a high viscosity organic colloid, and as a surface tension depressant anionic surface active agent. As examples of said colloidial agent there are mentioned gum tragacanth, high viscosity celluloses and algae. It is stated that any surface tension depressant can be employed which is compatible and non-reactive with the other constituents of the charge, and is effective to reduce the surface tension of the system, thus assisting its stability. All examples of the patent use vinyl acetate as a starting monomer.

U.S. Pat. No. 2,555,298 to Sturrock et al describes in Examples 4 and 5 thereof suspension polymerization of 2,4-dimethylstyrene and 2,5-dimethylstyrene in the presence of polyvinyl alcohol and potassium persulfate.

U.S. Pat. No. 2,673,194 to Grim, assigned to Koppers Company, Inc. describes suspension polymerization of an ethylenic unsaturated monomer in an aqueous medium using finely divided, difficulty water-soluble phosphate as a dispersing agent and an anionic surface active agent as an extender. Cited in said patent as examples of preferred extenders are organic sulfates and sulfonates such as long chain alkyl sulfates and sulfonates, and alkyl aromatic sulfonates. In this patent, these extenders are used in conjunction with difficulty water-soluble phosphates, not with polyvinyl alcohol.

U.S. Pat. No. 3,488,745 to Wright, assigned to Koppers Company, Inc. describes a preparation of vinyl aromatic polymer beads having an extremely narrow bead size distribution in an aqueous suspension system which is stabilized by the presence of a finely divided phosphate and 0.015 to 2.0% of an organic sulfonate or sulfamate having a surface active property that when 0.1% by weight thereof is dissolved in 10% aqueous sodium chloride solution the resultant solution has a surface tension between about 45 and 61 dynes per centimeter. The patent cites as examples of such useful organic sulfonates and sulfamates, sodium dipropyl sulfosuccinate, sodium N-isopropyl cyclohexyl sulfamate, sodium p-isopropylbenzene sulfonate, sodium p-biphenyl sulfonate, sodium 3-(trimethylsilyl)propane sulfonate, sodium p-vinylbenzene sulfonate, sodium 2,4,5,-trimethylbenzene sulfonate, etc.

U.S. Pat. No. 4,129,707 to Wright, assigned to Arco Polymer, Inc. describes a preparation of vinyl aromatic polymer composition by suspension polymerization in an aqueous medium using a finely divided phosphate salt, bisulfite or persulfate modifier, and an adjunct modifier having a general formula:

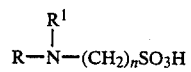

where n is 2 or 3, and R and $R^1$ may independently be hydrogen, 2-hydroxyethyl, 2-acetamido, tris (hydroxymethyl) methyl, cyclohexyl, or may together form ring structures such as morpholino, and piperazino and N'-(2-hydroxyethyl) piperazino. It is stated that said suspending medium is suitable for preparing vinyl aromatic polymer beads having larger than 600 microns diameter.

U.S. Pat. No. 4,237,255 to Murray, assigned to Mobil Oil Corporation describes a preparation of p-methyl styrene polymer composition by suspension polymerization in an aqueous medium in which a difficulty water-soluble phosphate is used as a suspending agent and sulfonated poly(p-methylstyrene) is used as an extender. It is stated that sulfonated poly(p-methylstyrene) is not useful when applied to the aqueous suspension polymerization of styrene. The suspending agent in Murray is limited to difficulty water-soluble phosphates, and hence polyvinyl alcohol is excluded.

Kishida et al, Japan Kokai, No. 120617/1980 describes a method of making impact resistant resins by an emulsion-suspension two step polymerization process wherein an ethylenic monomer or monomer mixture is emulsion polymerized onto an elastomeric polymer latex or elastomeric polymer to obtain a graft copolymer latex. The latex product is partially coagulated by adding an acidic material or an electrolyte material to the resultant mixture, an ethylenic monomer or a monomer mixture is added to the coagulated material and thereafter suspension polymerization is conducted by adding a suspension stabilizer to the mixture. As an example of suitable suspension stabilizer, there is disclosed sulfonated polystyrene salt. The Kishida et al patent publication is primarily directed to the manufacture of ABS resins. In Kishida et al process, sulfonated polystyrene salt is used as a primary suspension stabilizer (not as an extender), and the use of polyvinyl alcohol as a primary suspension stabilizer is not disclosed or suggested. The emulsion-suspension two step process of Kishida et al is very different from mass-suspension two step polymerization process or one step suspension polymerization process, because, among other things, in Kishida et al process the emulsifier and other ingredients used in the emulsion system are carried over to the suspension system.

In the preparation of impact resistant styrene-type polymer compositions, polyvinyl alcohol is a preferred suspending agent because of its high effectiveness for suspension stability. Quite often persulfate salts such as potassium and ammonium persulfate are used as an extender for polyvinyl alcohol as well as for difficulty water-soluble phosphate salts in the suspension polymerization of styrene-type monomer compositions.

It appears, however, that persulfate salts have certain undesirable properties such as development of yellowness in the final product when used in conjunction with polyvinyl alcohol. Therefore, alternative extenders which contribute to good stability of the suspension system and which do not substantially cause color development in the final product are desired. It is desirable that such extenders also afford other desired characteristics to the polymerized product such as narrow bead size distribution. Generally speaking, bead sizes below a certain level, for instance 300 microns, are undesirable. Such small beads are usually called fines. They tend to cause additional problems during the subsequent processing of the beads, for instance, in filtration and drying. Such fines also tend to develop yellowness in the final products more readily than large size beads. They also tend to increase the moisture content of the final product. On the other hand, beads having excessively large diameters are not desirable. For instance, when the bead size exceeds 2,000 microns, the extrusion of the polymer beads becomes slower compared to the extrusion of smaller sized beads because of slower heat transfer characteristics and in certain cases occluded water.

Usually in suspension polymerization process the aqueous suspension medium is used only once and discarded. If one recycles the suspension medium for the subsequent polymerization runs it will reduce various costs associated with the suspension polymerization process. For instance, it will reduce the quantity of fresh water consumed and the cost of waste-water treatment.

DISCLOSURE OF THE INVENTION

This invention is a process for preparing styrene-type polymer compositions, including rubber modified styrene-type polymer compositions, which comprises a step of suspension polymerizing a styrene-type monomer composition in an aqueous medium comprising polyvinyl alcohol (PVA) used as a suspending agent and a water-soluble sulfonated polystyrene, a water-soluble sulfonated styrene-maleic anhydride copolymer or a mixture thereof. The aqueous suspension medium comprising PVA and water-soluble sulfonated polystyrene, sulfonated styrene-maleic anhydride copolymer or a mixture thereof affords good suspension stability, provides polymer beads having good color properties and a desirable size distribution, and also prevents buildup of polymeric materials on the agitator, reactor walls etc. Moreover, the aqueous suspending medium can be reused.

DETAILS OF THE INVENTION

The monomer composition useful in the process of this invention is styrene or a monomer composition comprising at least 50 weight percent of styrene based on the total monomer weight. Preferably the weight percent of styrene in the monomer composition should be at least 70%. The remaining portion of the monomer composition may be a monomer copolymerizable with styrene such as α-methyl styrene, nuclear alkyl substituted styrenes, divinyl benzene, alkyl and allyl acrylates and methacrylates, diallyl esters of dibasic, aliphatic or aromatic acids, and butadiene or mixtures thereof. Thus, the term "styrene-type polymer compositions" as used in the specification and the appended claims means a polymer composition at least 50 weight percent of which is derived from styrene monomer and the remaining portion from a monomer or monomers copolymerizable with styrene such as those mentioned above. Similarly, the term "styrene-type monomer composition" means a monomer composition at least 50 weight percent of which is styrene monomer and the remainder is a monomer or monomers copolymerizable with styrene such as those mentioned above. Where a mass-suspension two-step polymerization process is used, the monomers reach a substantial extent of polymerization by the time they are transferred from the mass polymerization to the suspension polymerization step. For the sake of convenience, the term "styrene-type monomer composition" shall include partially polymerized forms of said monomer compositions defined above.

Where rubber modified styrene-type polymers are prepared, the monomer composition contains a rubber modifier, typically in the amount of 4–12% based on the total monomer weight. Examples of rubber modifiers suitable for this purpose are well known in the art, for example, polybutadiene and styrene-butadiene copolymers.

Polyvinyl alcohol is used as a suspending agent in the method of this invention. The polyvinyl alcohol may contain some residual acetate groups. Polyvinyl alcohol generally has a better suspending capability than finely divided, difficulty water-soluble phosphate salts such as tricalcium phosphate. However, polyvinyl alcohol has a tendency to cause some discoloration of the final polymer products. Therefore, polyvinyl alcohol is used more often in applications where the color or transparency of the final product is not so critical. Thus, polyvinyl alcohol is used more frequently for preparing rubber modified polystyrene compositions than for preparing so-called crystal polystyrene, because in the case of crystal polystyrene, the transparency of the final product is very important.

Water-soluble sulfonated polystyrene or sulfonated styrene-maleic anhydride copolymer, or a mixture thereof is used as an extender in the process of this invention. Water-soluble sulfonated polystyrene suitable for this invention can be prepared, for instance, by sulfonating polystyrene with a sulfonating agent such as chlorosulfonic acid or sulfonyl chloride in a suitable solvent such as methylene chloride. It is important that the sulfonated polystyrene used in this invention be water-soluble. The term "water-soluble" as used in this specification and the appended claims means a solubility of at least 1 gram per 100 grams of water at room temperature. It is preferred that such sulfonated polystyrene have water-solubility of at least 10 grams per 100 grams of water at room temperature. For this reason it is preferred that the extent of substitution of sulfonate groups on the benzene rings in such sulfonated polystyrene be at least about one sulfonate group per benzene ring. If the extent of the substitution of sulfonate groups is substantially lower than one sulfonate group per benzene ring, the water-solubility of the sulfonated polystyrene may become unsatisfactory. The molecular weight of the sulfonated polystyrene does not appear to be very critical as long as the polymer has a sufficient water-solubility. Thus, water-soluble sulfonated polystyrenes having a wide range of molecular weights can be used for this invention, i.e., from about 1,000 to several millions. A more preferred range is from about 2,000 to about 100,000.

Water-soluble sulfonated styrene-maleic anhydride copolymer suitable for this invention can be prepared, for instance, by sulfonating copolymers of styrene and maleic anhydride with a sulfonating agent such as chlorosulfonic acid or sulfonyl chloride in a suitable solvent such as methylene chloride. Again it is important that such sulfonated styrene-maleic anhydride copolymer be water-soluble, and for this reason it is preferable that the extent of substitution of sulfonate groups on the benzene rings in such sulfonated styrene-maleic anhydride copolymers be about one sulfonate group per benzene ring. Again, the molecular weight of such sulfonated copolymer does not appear to be very critical as long as the copolymer is water-soluble. A preferred range of the molecular weight of such sulfonated copolymers is again from about 2,000 to about 100,000.

The general method for preparing rubber modified polystyrene by suspension polymerization is well-known in the art. Typically a prepolymer is formed first by mass polymerization. The prepolymer may be polymerized either with or without an initiator up to a degree of polymerization, typically about 30% solids content excluding the solids portion due to the rubber initially added. The rubber content of the prepolymer is typically 4 to 12% by weight. After the prepolymer is prepared it is then fed to a suspension polymerization system. Suspension polymerization is usually conducted in the presence of an initiator. Oil-soluble peroxide compounds are usually used for this purpose. The initiator may be a mixture of two or more peroxides having different rates of thermal decomposition. Non-limiting examples of such initiators are benzoyl peroxide, acetyl peroxide, di-tertiary-butyl peroxide, lauroyl peroxide, t-butyl perbenzoate, t-butylperoctoate, and t-butylperacetate.

When crystal polystyrene is prepared by suspension polymerization method the prepolymerization step is usually omitted. Whether the product prepared is rubber modified polystyrene or crystal polystyrene, the final step of the suspension polymerization after about 97% monomer conversion is often conducted at a higher temperature than the temperature at which the primary suspension polymerization is conducted.

The concentration of polyvinyl alcohol in the aqueous suspension medium is typically within the range of 0.05–0.20% based on the total weight of the aqueous medium. Usually a dilute aqueous solution of polyvinyl alcohol, for instance 5% solution, is separately prepared and a desired amount of the solution is added to the suspension system. The dilute polyvinyl alcohol solution may be added to the suspension system in a step-wise fashion instead of adding all of the solution at the beginning of the suspension polymerization.

The concentration of the extender in the suspension medium is typically within the range of 0.005–0.1% based on the total weight of the aqueous medium. A more preferred concentration range of the extender in this invention is 0.01–0.5%, and a most preferred range is 0.015–0.035%.

The weight ratio between the organic phase and the aqueous phase in the suspension system of this invention is typically within the range of 40:60–60:40 by weight. If said ratio is below 40:60, the economy of the process is sacrificed because of the small amount of the organic material that can be processed per charge for a given facility. If said ratio is above 60:40, the risk of bead agglomeration becomes higher.

Advantages of the method of this invention include good suspension stability, a narrow and suitable bead size distribution of the product beads, good color characteristics (low yellowness index) of articles molded from the product beads, re-usability of the aqueous suspension medium, and a reduced tendency of reactor fouling. With regard to most of these characteristics, the suspension polymerization medium of this invention is better than the suspension polymerization medium comprising polyvinyl alcohol and a persulfate salt at comparable concentration levels.

It has been found that the color characteristics of polymer products produced in accordance with this invention are generally better than those of the polymer products obtained by the suspension polymerization method using a combination of polyvinyl alcohol and ammonium persulfate at comparable concentration levels.

It has been found that the bead size distribution of polymer products obtained by the method of this invention is narrow and desirable. The amount of fines (particles smaller than about 300 microns in diameter) in the polymer beads obtained by the method of this invention is generally small compared to beads obtained by the suspension polymerization method using polyvinyl alcohol and ammonium persulfate. As mentioned earlier, the reduction of the amount of fines in the polymer beads reduces problems associated with the filtration and drying of beads, improves the color characteristics of the final products, and reduces the moisture content of the final products.

In this invention it has been found that the aqueous suspension medium can be re-used in subsequent runs without sacrificing suspension stability, color characteristics or bead size distribution of the product. Re-use of the aqueous suspending medium leads to a reduction of the amount of fresh water consumed and the amount of waste water to be treated. Reduction of the cost of waste-water treatment is a significant commercial advantage. We have tested the feasibility of continuous re-use of the aqueous suspension medium in a series of experiments simulating large scale recycle runs. Thus, aqueous suspending media used in five separate batch experiments embodying the method of this invention were recovered after the polymerization and stored in a recycle storage tank. Since the recovery ratio of the aqueous medium in each run was about 90%, the charge of the aqeous medium in each recycle run consisted of the following: 90% of the water was supplied from the storage tank, the remaining 10% of the water was supplied as fresh demineralized water and make-up amounts of polyvinyl alcohol and an extender specified in this invention were added as a fresh supply. In this manner the amount of aqueous medium stored in the recycle tank was kept constant and 14 runs were repeated. The results indicated that the aqueous medium of this invention can be re-used without substantial sacrifice in suspension stability, color characteristics, or bead size distribution of the product. The re-use of the suspension medium did not cause any substantial reactor build-up.

The reaction mixture may contain various organic substances such as lubricants, antioxidants, and chain transfer agents which are well known in the art. Examples of such lubricants include fatty acid esters and mineral oils. Examples of antioxidants include butylated hydroxy toluene and long chain alkyl substituted phosphite compounds. Mercaptans are usually used as a chain transfer agent.

The following examples are given for the purpose of illustrating this invention.

EXAMPLE 1

A mixture containing 379 pounds of styrene, 49 pounds of polybutadiene, 245 grams of a hindered phenol antioxidant, 735 grams of a alkyl phosphite antioxidant and 123 grams of a stearate lubricant was stirred at 140° for 3 hours to produce a homogeneous solution. Thereafter an additional 80 pounds of styrene was added to the solution and the temperature of the solution was raised to 250° F. One hundred eighty four (184) grams of a mercaptan chain transfer agent dissolved in 7 pounds of styrene was also added to the solution. After stirring the solution for $4\frac{1}{4}$ hours at 250° F., 10.2 pounds of a mineral oil was added to the solution. The solution was prepolymerized for a total of 5 hours at 250° F. to about 38% solids content.

To 470 pounds of fresh water was added a controlled amount of phosphoric acid until the pH became 3.0. To this aqueous solution were added 1225 grams of 5% solution of sodium salt of a sulfonated polystyrene having an average molecular weight of 70,000 and an average of about one sulfonate group per styrene unit, and 2614 grams of 5% aqueous solution of polyvinyl alcohol. The solution was stirred for 10 minutes at room temperature. Then, the afore-mentioned prepolymer was added to this solution with stirring. After 10 minutes of further stirring, a solution made from 490 grams of a low-temperature organic peroxide initiator and 220 grams of a high-temperature organic peroxide initiator dissolved in 10.5 pounds of styrene was added to the reaction mixture. The temperature of the mixture was adjusted to 190° F. After the mixture has been stirred for 30 minutes at 190° F., 1307 grams of 5% aqueous solution of polyvinyl alcohol was added to the mixture and the reaction continued at this temperature for a total of 3 hours under nitrogen atmosphere. By this time, so-called "hard-bead stage" had been attained. Then, the reaction mixture was heated to 266° F. and the reaction continued at this temperature for 3 hours.

A total of five repeat runs were conducted in the manner described above using the sulfonated polystyrene salt. The amount of the sulfonated polystyrene salt was 250 ppm with respect to the total weight of the organic substance.

Various physical properties of the polymer products obtained in this example are summarized in Table 1. The Yellowness Index was measured according to the method prescribed in ASTM D-1925-70. Measurements were made on injection-molded plaques of $2\frac{1}{4}"\times4"\times\frac{1}{8}"$ size using a Hunter Laboratory Model D-25 Color Difference Meter manufactured by Hunter Associates Laboratory, Inc., 11495 Sunset Hills Road, Reston, Va. 22090.

EXAMPLE 2

As a control, four repeat runs were conducted in substantially the same manner as Example 1 except that ammonium persulfate was used as an extender instead of sulfonated polystyrene salt and a somewhat larger amount of polyvinyl alcohol was used. Thus, the amount of the first addition of 5% polyvinyl alcohol solution was 2970 grams and that of the second was 2430 grams. A total of 50 grams of ammonium persulfate was divided into four equal segments and the first segment was added to the reactor 30 minutes after the suspension polymerization system reached 190° F., and the second, third and fourth segments were added to the reactor at 30 minute intervals. The total amount of ammonium persulfate was about 200 ppm with respect to the total weight of the organic substance. The results are also shown in Table 1.

EXAMPLE 3

Two repeat runs were conducted in the same manner as Example 1 except that as an extender a sulfonated styrene-maleic anhydride copolymer (in sodium salt form) having an average molecular weight of about 3,000, about one sulfonate group per styrene unit and a ratio of about 3:1 between the sulfonated styrene unit and the maleic anhydride unit was used. In Run No. 1 the extender in an amount corresponding to 250 ppm with respect to the total weight of the organic substance was added at the start of the suspension polymerization; however, in Run No. 2 an amount corresponding to 125 ppm of the extender was added initially and another 125 ppm quantity was add 30 minutes after the suspension system reached 190° F. The results are summarized in Table 2.

EXAMPLE 4

Three repeat runs were conducted in the same manner as Example 1 except that as an extender a sulfonated styrene-maleic anhydride copolymer (in sodium salt form) having an average molecular weight of about 5,000, about one sulfonate group per styrene unit and a ratio of about 1:1 between the sulfonated styrene unit and the maleic anhydride unit was used. In Runs 1 and 2 an amount corresponding to 250 ppm of the extender with respect to the total weight of the organic substance was added at the beginning of the suspension polymerization. In Run No. 3, an amount corresponding to 125 ppm of the material was added initially and another 125 ppm of the material was added 30 minutes after the suspension system reached 190° F. The results are summarized in Table 2.

EXAMPLE 5

Re-usability of the aqueous medium used in the process of this invention was tested in a series of fourteen runs. Thus, the aqueous media used in runs 1 through 5 of Example 1 were recovered by using a centrifuge, combined and stored in a recycle storage tank. In each of the five runs, about 90% of the aqueous medium originally charged to the suspension polymerization system was recovered. For each of the fourteen recycle runs the prepolymerization step was identical to the one described in Example 1. The suspension polymerization step was conducted in substantially the same manner as Example 1 except that 90% of the aqueous medium charged to the suspension polymerization system was supplied from the recycle storage tank and the remaining 10% was supplied as a fresh water and, furthermore, a fresh make-up amount of polyvinyl alcohol (a total of 0.09% of the weight of the aqueous medium, which amount is also the total amount of polyvinyl alcohol used in Example 1) and a fresh make-up amount of the same sulfonated polystyrene as used in Example 1 (250 ppm with respect to the total weight of the organic substance) were charged to the reactor. At the end of each recycle run the aqueous medium was recovered (about 90% recovery ratio) and returned to the recycle storage tank. This process was repeated 14 times. The total of 0.09 weight percent of polyvinyl alcohol was added in two steps, the first addition in an amount corresponding to 0.06 weight percent being made at the start of the suspension polymerization and the second addition in an amount corresponding to 0.03 weight percent being made 30 minutes after the reactor contents reached 190° F. There was a tendency for a progressive increase of the polyvinyl alcohol concentration in the aqueous medium as the number of recycle runs increased, indicating that a portion of the PVA was retained in the aqueous phase in each run, but our analysis showed the PVA concentration in the aqueous medium at the time of the completion of the second PVA addition never exceeded 0.21% in any of the recycle runs.

At the end of the first seven runs the reactor was cleaned. The reactor was clean at the end of the fourteenth run. The suspension stability was satisfactory throughout the runs. The yellowness index and the bead size distribution were satisfactory at the end of the recycle runs. The results of physical properties of the polymer products are summarized in Table 3.

TABLE 2

| Run Number | EXAMPLE 3 | | | EXAMPLE 4 | | | |
|---|---|---|---|---|---|---|---|
| | 1 | 2 | Av. | 1 | 2 | 3 | Av. |
| Yellow Index | 0.5 | 0.8 | 0.7 | — | −3.3 | −1.1 | −2.2 |
| Bead Size | | | | | | | |
| C (μ) | 1450 | 1070 | 1260 | 780 | 740 | 770 | 760 |
| F | 1.8 | 2.0 | 1.9 | 3.1 | 2.6 | 2.6 | 2.8 |
| +14 Mesh (>1400μ) | 57.3 | 25.6 | 41.5 | 14.7 | 15.1 | 12.5 | 14.1 |
| −15 Mesh (<350μ) | 8.1 | 1.3 | 0.7 | 8.8 | 8.5 | 8.5 | 8.6 |
| −200 Mesh (<74μ) | 0.5 | 0.6 | 0.6 | 0.4 | 0.8 | 1.4 | 0.9 |

What is claimed is:

1. A method of making a styrene-type poloymer composition which comprises a step of suspension polymerizing a styrene-type monomer composition in an aqueous medium comprising water, polyvinyl alcohol and a water-soluble sulfonated styrene-maleic anhydride copolymer.

2. A method according to claim 1, wherein the concentration of said water-soluble sulfonated styrene-maleic anhydride copolymer is within the range of 0.005–0.1% based on the weight of the aqueous medium.

3. A method according to claim 1 or 2, wherein the concentration of polyvinyl alcohol is within the range of 0.05–0.20% based on the weight of the aqueous medium.

TABLE 3

| RUN NUMBER | 1 | 2 | 3 | 4 | 5 | 6 | 7 | 8 | 9 | 10 | 11 | 12 | 13 | 14 | AV. |
|---|---|---|---|---|---|---|---|---|---|---|---|---|---|---|---|
| Yellowness Index | −0.5 | 1.7 | −2.0 | −0.6 | 5.3 | 9.1 | 9.6 | −0.9 | 5.6 | 4.9 | −3.0 | 1.6 | 0.9 | 6.3 | 2.7 |
| Bead Size: | | | | | | | | | | | | | | | |
| C (μ) | 1050 | 1050 | 1020 | 990 | 990 | 1080 | 950 | 1150 | 820 | 660 | 1600 | N/A | 1690 | 820 | 1067 |
| F | 2.4 | 2.1 | 2.2 | 2.6 | 2.5 | 2.6 | 2.9 | 2.5 | 3.1 | 3.0 | 1.8 | " | 2.8 | 3.1 | 2.6 |
| +14 Mesh | 34.8 | 24.8 | 27.1 | 27.4 | 25.6 | 29.8 | 26.3 | 23.4 | 23.9 | 14.7 | 66.6 | " | 39.8 | 24.4 | 29.9 |
| −50 Mesh | 1.6 | 1.9 | 1.1 | 4.3 | 3.7 | 4.4 | 8.0 | 3.7 | 7.6 | 10.6 | tr | " | 3.5 | 8.2 | 4.5 |
| −200 Mesh | 1.4 | 0.9 | 0.5 | 1.6 | 1.9 | 2.0 | 3.8 | 8.4 | 2.1 | 2.0 | 2.2 | " | 2.7 | 2.7 | 2.5 |

TABLE 1

| RUN NUMBER | EXAMPLE 1 | | | | | | EXAMPLE 2 | | | | | | | | |
|---|---|---|---|---|---|---|---|---|---|---|---|---|---|---|---|
| | 1 | 2 | 3 | 4 | 5 | AV. | 1 | 2 | 3 | 4 | 5 | 6 | 7 | 8 | AV. |
| Yellowness Index | −2.5 | 3.9 | 0.10 | −2.3 | −3.3 | −0.8 | 1.9 | 3.7 | 1.5 | 2.4 | 0.3 | 3.1 | 4.5 | — | 2.5 |
| Bead Size: | | | | | | | | | | | | | | | |
| *C (μ) | 1020 | 1040 | 860 | 1000 | 710 | 926 | 980 | 1180 | 980 | 1100 | 1300 | 1200 | 740 | 1200 | 1085 |
| **F | 2.3 | 2.3 | 2.1 | 2.3 | 2.2 | 2.2 | 2.5 | 2.4 | 2.4 | 2.0 | 2.1 | 1.9 | 2.7 | 2.4 | 2.3 |
| +14 Mesh (>1410μ) | 21.1 | 20.6 | 17.6 | 20.9 | 13.0 | 19.1 | 22.8 | 31.5 | 19.7 | 27.1 | 39.3 | 34.5 | 12.5 | 31.6 | 27.4 |
| −50 Mesh (<350μ) | 3.6 | 4.3 | 0.8 | 2.1 | 3.2 | 2.8 | 5.9 | 4.2 | 2.2 | 2.6 | 2.1 | 2.0 | 9.2 | 5.3 | 4.2 |
| −200 Mesh (<74μ) | 0.4 | 0.4 | 0.3 | 0.6 | 0.4 | 0.4 | 2.3 | 3.5 | 4.2 | 4.5 | 7.2 | 2.8 | 2.4 | 2.4 | 3.7 |

Note:
*C is a diameter corresponding to 50% cumulative distribution, namely C is equal to $D_{50}$.
**F is equal to the square root of $D_5/D_{95}$ where $D_5$ is a diameter corresponding to 5% cumulative distribution (counting from the largest beads) and $D_{95}$ is a diameter corresponding to 95% cumulative distribution. The F value is an indication of the spread of the bead size distribution.